(12) United States Patent
Liang et al.

(10) Patent No.: US 10,173,398 B2
(45) Date of Patent: Jan. 8, 2019

(54) METHOD OF MAKING A COMPOSITE NON-PLANAR DOOR SKIN

(71) Applicant: Masonite Corporation, Tampa, FL (US)

(72) Inventors: Bei-Hong Liang, Naperville, IL (US); Karine A. Luetgert, Geneva, IL (US); Henry Coghlan, Elburn, IL (US); John Peter Walsh, St. Charles, IL (US); Geoffrey B. Hardwick, St. Charles, IL (US)

(73) Assignee: Masonite Corporation, Tampa, FL (US)

( * ) Notice: Subject to any disclaimer, the term of this patent is extended or adjusted under 35 U.S.C. 154(b) by 410 days.

(21) Appl. No.: 15/168,949

(22) Filed: May 31, 2016

(65) Prior Publication Data
US 2016/0347037 A1     Dec. 1, 2016

Related U.S. Application Data

(60) Continuation of application No. 11/716,620, filed on Mar. 12, 2007, now Pat. No. 9,352,486, which is a
(Continued)

(51) Int. Cl.
*B32B 21/14* (2006.01)
*B27N 7/00* (2006.01)
(Continued)

(52) U.S. Cl.
CPC .............. *B32B 21/14* (2013.01); *B27N 7/005* (2013.01); *B32B 37/06* (2013.01); *B32B 37/10* (2013.01);
(Continued)

(58) Field of Classification Search
CPC .............................. B27N 7/005; B32B 21/14
See application file for complete search history.

(56) References Cited

U.S. PATENT DOCUMENTS

| 2,751,946 A | 6/1956 | Gramelspacher |
| 3,480,501 A | 11/1969 | Burch |
| (Continued) | | |

FOREIGN PATENT DOCUMENTS

| JP | 55144155 A | * 11/1980 |
| JP | 59215850 A | * 12/1984 |

*Primary Examiner* — Scott W Dodds
(74) *Attorney, Agent, or Firm* — Berenato & White, LLC

(57) ABSTRACT

A method of forming a composite article is disclosed that involves providing a press having first and second platens, a cellulosic fiber substrate having a first thickness, and a layer of material such as a wood veneer, foil, or non-creped paper, where the layer of material has a thickness less than the thickness of the cellulosic fiber substrate. A layer of bonding material is placed onto the cellulosic fiber substrate or the layer of material, and the layer of material is placed onto the cellulosic fiber substrate so that the bonding material is between the layer of material and the cellulosic fiber substrate. The cellulosic fiber substrate and layer of material are placed between the first and second platens, and at least one of the first and second platens is moved toward the other of the first and second platens to deform the cellulosic fiber substrate and layer of material into a predetermined configuration while bonding the layer of material to the cellulosic fiber substrate without cracking or wrinkling the layer of material.

20 Claims, 3 Drawing Sheets

Related U.S. Application Data division of application No. 10/291,757, filed on Nov. 12, 2002, now Pat. No. 7,195,686.

(51) Int. Cl.
*B32B 37/06* (2006.01)
*B32B 37/10* (2006.01)

(52) U.S. Cl.
CPC ..... *B32B 2607/00* (2013.01); *Y10T 156/1002* (2015.01); *Y10T 156/1023* (2015.01); *Y10T 156/1039* (2015.01); *Y10T 156/1044* (2015.01); *Y10T 428/31982* (2015.04)

(56) References Cited

U.S. PATENT DOCUMENTS

| | | | |
|---|---|---|---|
| 3,545,094 A | 12/1970 | Barnes et al. | |
| 3,591,448 A | 7/1971 | Elmendort | |
| 3,715,257 A | 2/1973 | Dunaway et al. | |
| 3,837,634 A | 9/1974 | Cobb | |
| 4,084,996 A | 4/1978 | Wheeler | |
| 4,146,662 A | 3/1979 | Eggers et al. | |
| 4,244,846 A * | 1/1981 | Edler | C08L 97/02 156/328 |
| 4,264,400 A | 4/1981 | Breitmar | |
| 4,293,362 A | 10/1981 | Drobina | |
| 4,327,142 A | 4/1982 | Norizi | |
| 4,643,787 A | 2/1987 | Goodman | |
| 4,726,881 A | 2/1988 | Schultz | |
| 4,816,314 A | 3/1989 | Prawdzik et al. | |
| 4,853,062 A | 8/1989 | Garland | |
| 5,194,310 A | 3/1993 | Lenderink | |
| 5,217,289 A | 6/1993 | Woodward et al. | |
| 5,423,933 A | 6/1995 | Horian | |
| 5,496,601 A | 3/1996 | Schurb | |
| 5,526,857 A | 6/1996 | Forman | |
| 5,540,026 A * | 7/1996 | Gartland | B27M 3/0093 156/245 |
| 5,573,829 A * | 11/1996 | Decker | B27D 1/00 428/156 |
| 5,755,068 A | 5/1998 | Ormiston | |
| 6,073,419 A * | 6/2000 | Moyes | B27N 7/00 52/309.9 |
| 6,105,991 A | 8/2000 | Dodge et al. | |
| 6,200,687 B1 | 3/2001 | Smith et al. | |
| 6,312,632 B1 | 11/2001 | Graf | |
| 6,500,372 B1 | 12/2002 | Frankefort et al. | |
| 7,195,686 B2 * | 3/2007 | Liang | B27N 7/005 156/196 |
| 2002/0153094 A1 | 10/2002 | Clifford | |
| 2003/0029517 A1 | 2/2003 | Kumpulainen | |
| 2004/0103615 A1 | 6/2004 | Lynch et al. | |

\* cited by examiner

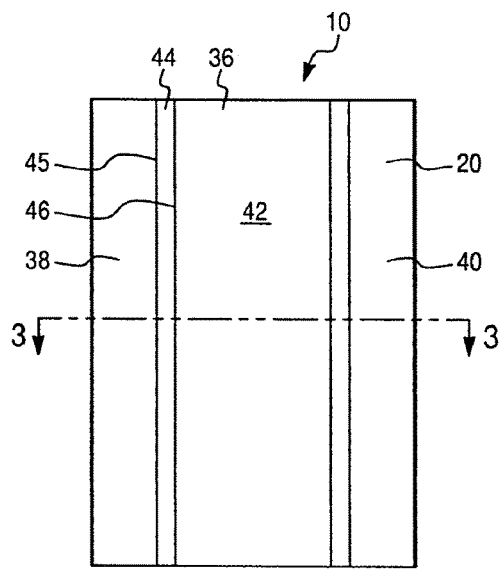
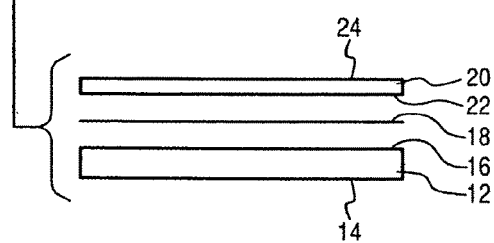
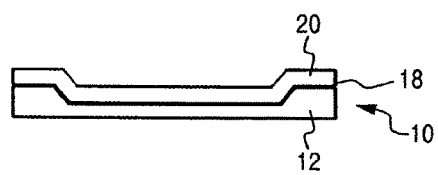
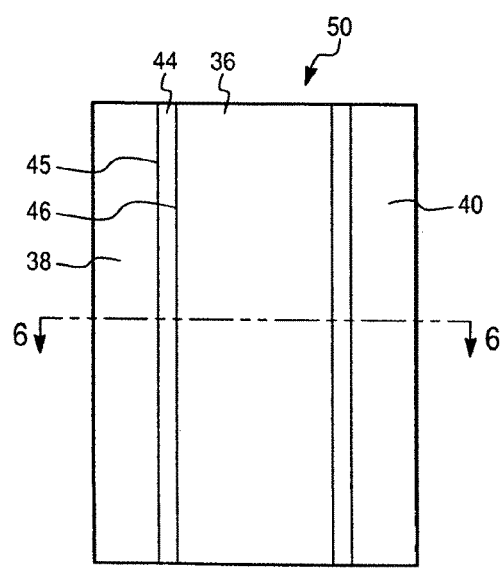
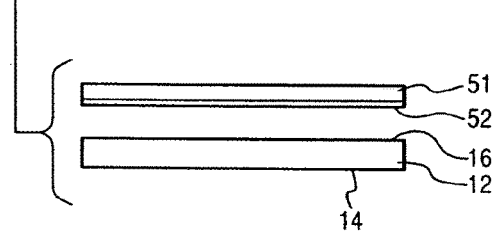
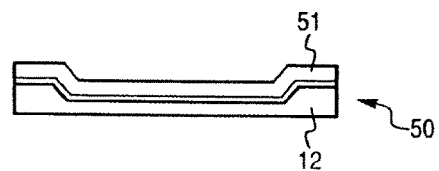

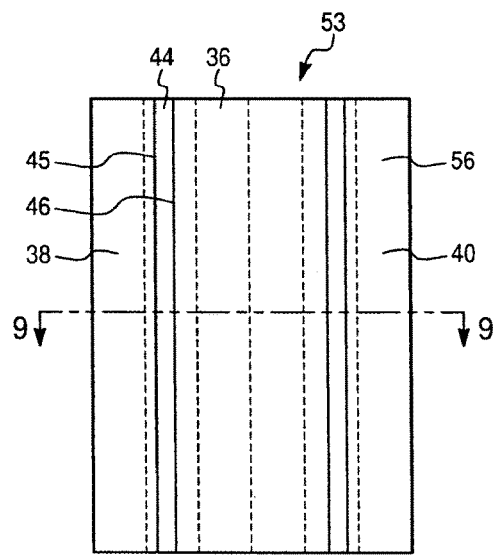
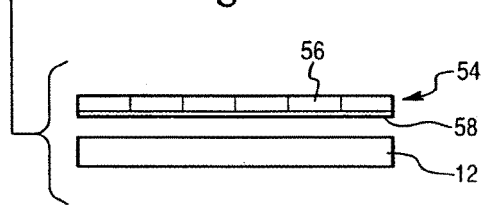
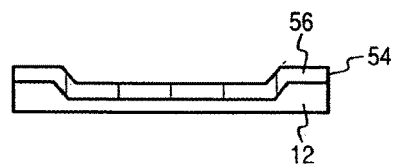
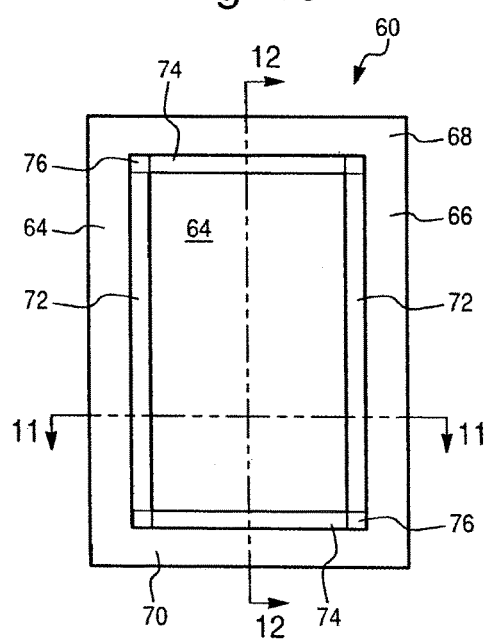
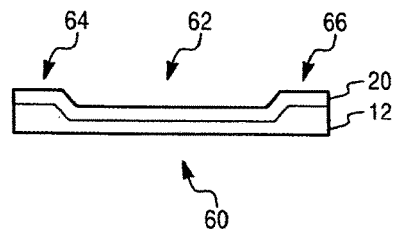

METHOD OF MAKING A COMPOSITE NON-PLANAR DOOR SKIN

CROSS-REFERENCE TO RELATED APPLICATIONS AND CLAIM TO PRIORITY

This application is a continuation of application Ser. No. 11/716,620, filed Mar. 12, 2007, which was patented as U.S. Pat. No. 9,352,486, issued May 31, 2016, which is a divisional application of Ser. No. 10/291,757, filed Nov. 12, 2002, which was patented as U.S. Pat. No. 7,195,686, issued Mar. 27, 2007, all of the disclosures of which are incorporated herein by reference and to which priorities are claimed.

FIELD OF THE INVENTION

The present invention is directed toward a method of forming a molded panel having a decorative surface and to the molded panel formed by this method, and, more specifically, toward a method of attaching a decorative layer, such as a wood veneer, a foil, or a non-creped paper, to a substrate in a pressing operation that deforms both the substrate and the decorative layer to produce a panel having a substantially unblemished, finished surface and to the panel formed by this method.

BACKGROUND OF THE INVENTION

Many products that have heretofore been manufactured from natural wood are now formed from composite materials that include fibers obtained from wood or non-wood sources. For example, composite panels may be formed by coating a quantity of fibers with a heat curable resin binder, placing a loose mat of these coated fibers in a press, and applying heat and pressure to the mat to reduce its thickness and cure the resin, thereby producing a thin, wood-like board. Such boards may be referred to as "chip board" or "fiber board," depending on the source of the fibers used in their manufacture, and fiberboards, in turn, may be referred to as softboard, medium density fiberboard (MDF) or hardboard, depending on their densities. These boards are sometimes attached to rectangular frames to form doors, and, when used in this manner, are referred to as "door skins." When such panels are formed with flat surfaces, they are often referred to as "flush" panels or "flush" door skins; when they are formed with a pattern of depressions, to simulate the appearance of a traditional rail and stile door having panels, for example, they are often referred to as "molded" panels or "molded" door skins.

While fiberboard panels have a hardness and flexibility similar to sheets of natural wood, their surfaces lack the grain and texture of natural wood, and are therefore generally not suitable for use in applications where a natural wood appearance is desired. Rather, fiberboards generally must be painted or otherwise covered to produce a finished surface. If a fiberboard panel having a wood grain appearance is desired, a layer of covering material must be applied. The layer of covering material may be a natural wood veneer or a paper, foil, or film printed with a wood grain pattern. These layers of covering material are applied in a process separate from the panel forming process, using a membrane press, for example. This additional manufacturing step, however, increases the cost of such products.

Manufactured wood products, such as the flush door skins mentioned above, may be transformed into non-planar products, such as molded door skins, by placing them into presses and subjecting them to heat and pressure. A process for transforming fiberboard panels is known from U.S. Pat. No. 6,073,419, for example, which patent is hereby incorporated by reference. This patent teaches that resin impregnated crepe paper can be placed into the press while a flush panel is deformed. The creping allows the paper to stretch and deform along with the panel and provides a moisture barrier for use in water resistant applications.

The heat and pressure required for changing the shape of the flush panel have in the past required the use of a creped paper layer. Non-creped paper tended to tear and wrinkle and produce a surface that required further processing to make it acceptable as a finished surface. Prior art papers used to affect surface properties are generally creped or otherwise textured to allow them to expand with the changing surface area of the flush panel as it deforms. Therefore, they do not produce a uniformly colored surface when the article is removed from the press. Articles formed in this manner must be painted or otherwise covered to hide the wrinkles, stretch marks, and irregularity in the surface color finish.

It is therefore desirable to produce a decorative, finished surface on a panel of composite material during an operation that forms a flush panel into a molded panel.

SUMMARY OF THE INVENTION

A first aspect of the present invention comprises a method of forming a composite article that involves providing a press having first and second platens, a cellulosic fiber substrate having a first thickness and a layer of material such as wood veneer, foil, or non-creped paper. The layer of material has a thickness less than the thickness of the cellulosic fiber substrate. A bonding material is applied to the cellulosic fiber substrate or to the layer of material, and the layer of material is placed onto the cellulosic fiber substrate so that the bonding material is between the layer of material and the substrate. Next, the substrate and layer of material are placed between the first and second press platens, and at least one of the platens is moved toward the other one to deform the cellulosic fiber substrate and layer of material into a predetermined configuration and bond the layer of material to the cellulosic fiber substrate without cracking or wrinkling the layer of material. Another aspect of the invention is a product made by this method.

A further aspect of the invention comprises a composite article including a layer of MDF having a first surface and a layer of veneer bonded to the first surface. The first surface is deformed under the application of heat and pressure while in contact with the layer of veneer to form a sharp edge in the veneer layer.

Another aspect of the invention comprises a method of forming a composite article that involves providing a press and an MDF substrate having first and second sides, and placing a flat sheet of wood veneer on the first side of the MDF substrate, then placing the MDF substrate and wood veneer overlay into the press. The press is closed to simultaneously deform the MDF substrate and wood veneer and bond the wood veneer to the MDF substrate to create a composite article.

A further aspect of the invention comprises a composite article that includes a deformed sheet of MDF and an uncracked, deformed layer of wood veneer bonded to the deformed sheet of MDF. The uncracked, deformed layer of wood veneer has a moisture content of less than about 2 to 4 percent.

An additional aspect of the invention is a method of forming a molded panel having a natural wood surface that involves providing a press having first and second platens for deforming sheets of wood composite material and providing a flat sheet of wood veneer. Next, a sheet of wood composite material is heated and moisturized, and a layer of bonding material is applied to either or both of the heated and moisturized sheet of wood composite material and the flat sheet of wood veneer. The flat sheet of wood veneer is placed onto the heated and moisturized sheet of wood composite material, and then the wood composite and veneer are placed into the press between the first and second platens. At least one of the first and second platens is moved toward the other of the first and second platens to deform and bond the MDF and the wood veneer into a finished article. The finished article is removed from the press and then wetted to raise the moisture content of the wood veneer to prevent the veneer from deforming or causing the wood composite panel to bow or cup.

An additional aspect of the invention comprises a method of forming a composite article having a finished surface that involves providing an MDF substrate having first and second sides and a surface area and laying a sheet of material having the same surface area on the first side. The MDF substrate and sheet of material are placed into a press, and the press is closed to simultaneously deform the MDF substrate and the sheet of material and bond the sheet of material to the MDF without forming wrinkles in the sheet of material.

BRIEF DESCRIPTION OF THE DRAWINGS

The invention will be better understood from a reading of the detailed description provided below in connection with the following drawings.

FIG. 1 is a top plan view of a panel formed according to the present invention.

FIG. 2 is an exploded end elevational view of the panel of FIG. 1.

FIG. 3 is a cross-sectional view taken through line 3-3 of FIG. 1.

FIG. 4 is a top plan view of a second embodiment of a panel formed according to the present invention.

FIG. 5 is an exploded end elevational view of the panel of FIG. 4.

FIG. 6 is a cross-sectional view taken through line 6-6 of FIG. 4.

FIG. 7 is a top plan view of a third embodiment of a panel formed according to the present invention.

FIG. 8 is an exploded end elevational view of the panel of FIG. 7.

FIG. 9 is a cross-sectional view taken through line 9-9 of FIG. 7.

FIG. 10 is a top plan view of a fourth panel formed according to the present invention.

FIG. 11 is a cross-sectional view taken along line 11-11 of FIG. 10.

DETAILED DESCRIPTION OF THE INVENTION

Figure 12:
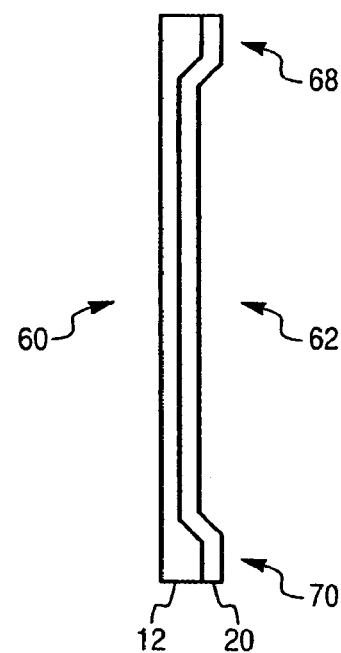
FIG. 12 is a cross-sectional view taken along line 12-12 of FIG. 10.

Referring now to the drawings, wherein the showings are for purposes of illustrating preferred embodiments of the invention only, and not for purposes of limiting same, FIGS. 1-3 illustrate a panel 10 formed from a first substrate 12, such as medium density fiberboard (MDF), having a lower surface 14 and an upper surface 16, a layer of adhesive 18, which may be a thermosetting resin or adhesive, such as a urea-based resin or adhesive, preferably melamine-urea-formaldehyde resin or urea-formaldehyde resin or paper impregnated melamine, for example, and a covering layer 20 having a lower surface 22 and an upper surface 24. Covering layer 20 may comprise a wood veneer, a foil, or a non-creped paper material which may be plain or bear a printed or other design or image.

Figure 13:
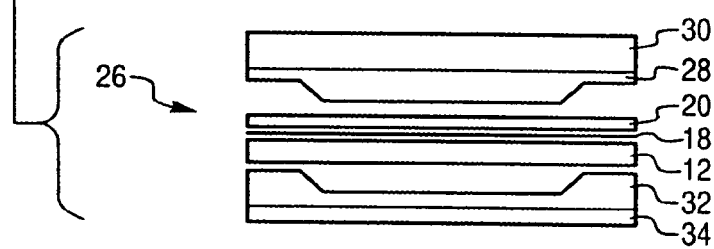
FIG. 13 is a schematic sectional view of a press for use in forming the panels of the subject invention.

Panel 10 is formed by placing adhesive 18 on substrate 12, placing covering layer 20 on top of the adhesive 18 and placing the article thus formed into a press 26, illustrated in FIG. 13, having an upper die 28 attached to an upper platen 30 and a lower mold cavity 32 attached to a lower platen 34. To make substrate 12 easier to deform, it is preferably heated and moistened before the covering layer 20 is attached in the manner taught in WO 98/48992, which is hereby incorporated by reference. One of the platens 30, 34 is moved toward the other to close the press 26, and heat and pressure are applied to the article in the press 26 until it assumes the profile illustrated in FIG. 3. Pressure is applied cyclically in the manner taught in WO/9848992, at a constant rate, or at a constantly increasing rate. The press 26 may be vented during the pressing operation to release steam and other volatile materials generated during the pressing operation. The heat of the press 26 both keeps the substrate 12 at a temperature at which it is deformable and cures adhesive 18 to bond the covering layer 20 to the substrate 12.

The heated and moistened substrate 12 enters the press 26 with a moisture content of about 10-12 percent by weight and exits with a total moisture content of about 5 to 7 percent by weight. When covering layer 20 is a wood veneer, it cannot be preheated and moistened in the same manner as the substrate 12 without warping or bowing the veneer. However, if the veneer is placed into the press 26 without pre-moistening, it emerges at a very low moisture level, less than 2-4 percent, for example, and soon deforms, ruining the surface appearance of the panel 10. Therefore, it has been found necessary to moisturize the panel 10 when it is removed from the press 26, to increase the moisture content of the veneer to prevent the veneer from deforming. This may be done, for example, by spraying water on the panel 10. Surprisingly, it has been found that this moisturizing step prevents the veneer from deforming and does not adversely affect the properties of the panel 10. The panel 10, after moistening will have a moisture content of about 7 percent. When covering layer 20 is a foil or a non-creped paper, the post-pressing moisturizing step may be omitted.

Preferred veneers include those comprising cherry or mahogany, although many different woods provide satisfactory results. Furthermore the thickness of the veneer is preferably in the 0.3 to 0.9 mm range, most preferably about 0.6 mm. A preferred adhesive 18 is a melamine impregnated sheet of paper.

Because the substrate 12 and covering layer 20 are deformed in the same step by the same molds, the lower surface 22 of the covering layer 20 will correspond almost exactly to the upper layer 16 of covering layer 20. This allows the adhesive 18 to securely bond these two layers 12, 20, and helps ensure that the substrate 12 supports the somewhat fragile covering layer 20 over its entire surface. Moreover, when covering layer 20 is a layer of wood veneer, the heat of the press 26, and the moisture released in the press 26 during the pressing operation, help mold the outside surface of covering layer 20 and form a sharper edge than would have been possible had a wood veneer covering layer been attached to a previously molded substrate. This simultaneous deformation produces a panel having better fidelity and sharper definition that was typically obtained from prior art processes.

Panel 10 formed by this process includes an upper surface 36 having first and second planar side portions 38, 40 and a central planar portion 42 therebetween, as shown in FIG. 1. A first angled wall 44 extends between first planar side portion 38 and central portion 42 and connects to first planar side portion 38 at a first corner 45 and to central portion 42 at a second corner 46. The distance between the plane of the first and second side portions 38, 40 and the plane of the central planar portion 42 is preferably about 6-9 mm. It is believed that deforming the panel 10 in one direction only, namely in a direction parallel to the length of corners 45, 46, helps reduce the likelihood that the covering layer 20 will deform, wrinkle or crack. When covering layer 20 is a wood veneer, the veneer should be applied to the substrate 12 with its grain direction aligned with the direction of deformation, that is aligned with corners 45 and 46.

When covering layer 20 is a non-creped paper or foil, it may include a printed pattern, such as wood grain, inlaid tiles, or a detailed graphic or artistic image. Because the covering layer 20 is not creped, the product leaves the press with a finished surface, and any image on that surface is not torn, wrinkled, or distorted.

FIGS. 4-6 illustrate a panel 50 according to a second embodiment of the present invention. Elements common to both embodiments are identified with the same reference numerals. Panel 50 includes a substrate 12 and a covering layer 51 comprising a wood veneer having a paper backing 52. This paper backing 52 is present on many commercially available veneers. The paper backing 52 helps maintain the integrity of the veneer when pressed and reduces the likelihood that the veneer will crack during pressing. The use of paper backing 52 may allow for greater offsets between the plane of side portions 38, 40 and the plane of a center area 43 of the panel 50. Furthermore, the paper backing 52 may incorporate a heat activated bonding agent that will bond the covering layer 51 to the substrate 12 during pressing, eliminating the need for a separate adhesive applied to the substrate. Alternately, a separate bonding agent, such as a liquid adhesive or a resin impregnated paper sheet, could be used to join the paper-backed covering layer 51 to substrate 12. Panel 50 is formed by pressing the covering layer 51 with paper backing 52 and substrate 12 in a press 26 as discussed above. Veneers having backings in the form of meshes or scrims or fabrics or layers of fusible material are also commercially available and may be used in the present invention as well.

FIGS. 7-9 depict a panel 53 according to third embodiment of the present invention. Elements common to previous embodiments are identified with the same reference numerals. In this embodiment, a covering layer 54 comprising a plurality of strips 56 of wood veneer secured together by a paper backing 58 is used. The strips 56 are preferably about six inches wide. The use of joined-together strips 56 may provide a covering layer 54 having improved flexibility in the direction of the length of strips 56 and allow the covering layer 54 to flex when pressed with less chance of cracking or warping.

FIGS. 10-12 depict a fourth embodiment of the present invention wherein a panel 60 includes a depressed central portion 62 surrounded by first and second planar side portions 64, 66 a planer top portion 68 and a planar lower portion 70. First and second sloped walls 72 connect first planar side portion 64 to central portion 62 while third and fourth sloped walls 74 connect the top portion 68 and bottom portion 70 to the central portion. The slope of the third and fourth sloped walls 74 is less than the slope of the first and second sloped walls 72 to minimize cracking when covering layer 20 is a wood veneer and to minimize wrinkling and/or tearing when covering layer 20 is a foil or paper. In addition, the transition areas 76 between the first and second sloped walls 72 and the third and fourth sloped walls 74 are smooth and gradual, as seen in FIG. 10, which further reduces the cracking or wrinkling that would likely occur if these sloped walls 72, 74 met at sharp angles.

The present invention has been described above in terms of several preferred embodiments. However, it should be understood that may obvious modifications and additions to these embodiments will become apparent to those skilled in the art after reading this disclosure. For example, while the invention has been described as primarily useful in connection with fiberboard, it could also be practiced on other materials such as fiberglass. Moreover, the panels formed by this method can vary in shape and configuration and might be useful, for example, as baseboard. It is intended that all such obvious modifications and additions form a part of this invention to the extent that they are included within the scope of the several claims appended hereto.

We claim:

1. A method of making a composite non-planar door skin, comprising the steps of:
    heating and pre-moisturizing a medium density fiberboard sheet;
    placing the medium density fiberboard sheet and a wood veneer layer in a press without pre-moisturizing the wood veneer layer;
    deforming and bonding the medium density fiberboard sheet and the wood veneer layer together under application of heat and pressure to form a composite non-planar door skin;
    wetting the composite non-planar door skin to raise the moisture content of the wood veneer layer,
    wherein the medium density fiberboard is a continuous layer having an exterior major surface,
    wherein the wood veneer layer covers the exterior major surface of the medium density fiberboard, and
    wherein the composite non-planar door skin has an exterior surface comprising a planar central portion extending along a first plane, a first planar side portion and a second planar side portion positioned at opposite first and second sides of the planar central portion and extending in a second plane that is spaced apart from the first plane, a planar top portion and a planar lower portion positioned at opposite first and second ends of the planar central portion and extending in the second plane, a first angled wall connecting the first side of the planar central portion to the first planar side portion, a second angled wall connecting the second side of the planar central portion to the second planar side portion, a third angled wall connecting the planar top portion with the first end of the planar central portion, and a fourth angled wall connecting the planar lower portion with the second end of the planar central portion.

2. The method of claim 1, wherein the third and fourth angled walls have a slope that is less than a slope of the first and second angled walls.

3. The method of claim 1, wherein said deforming step comprises deforming the medium density fiberboard sheet and the wood veneer layer in a thickness direction of the composite non-planar door skin.

4. The method of claim 1, wherein the medium density fiberboard sheet and the wood veneer layer have a rectangular shape, and wherein the first plane is parallel to the second plane.

5. The method of claim 1, wherein the first plane and the second plane are spaced apart from one another by 6-9 mm.

6. The method of claim 1, wherein the wood veneer layer has a thickness in the range of 0.3 mm to 0.9 mm.

7. The method of claim 1, wherein said bonding step comprises placing a layer of bonding material between the medium density fiberboard sheet and the wood veneer layer.

8. The method of claim 1, wherein the heated and pre-moistened medium density fiberboard sheet enters the press with a moisture content of about 10-12 weight percent and exits the press with a moisture content of about 5-7 weight percent.

9. A method of making a composite non-planar door skin, comprising the steps of:
heating and pre-moisturizing a medium density fiberboard sheet;
placing the medium density fiberboard sheet and a wood veneer layer in a press without pro-moisturizing the wood veneer layer;
deforming and bonding the medium density fiberboard sheet and the wood veneer layer together under application of heat and pressure to form a composite non-planar door skin;
wetting the composite non-planar door skin to raise the moisture content of the wood veneer layer,
wherein the medium density fiberboard sheet is a continuous layer having an exterior major surface,
wherein the wood veneer layer comprises a plurality of wood veneer strips collectively covering the exterior major surface of the medium density fiberboard sheet, and
wherein the composite non-planar door skin has an exterior surface comprising a planar central portion extending along a first plane, a first planar side portion and a second planar side portion positioned at opposite first and second sides of the planar central portion and extending in a second plane that is spaced apart from the first plane, a first angled wall connecting the first side of the planar central portion to the first planar side portion, and a second angled wall connecting the second side of the planar central portion to the second planar side portion, the first and second planar side portions and the first and second angled walls each extending an entire length of the composite non-planar door skin.

10. The method of claim 9, wherein the heated and pre-moistened medium density fiberboard sheet enters the press with a moisture content of about 10-12 weight percent and exits the press with a moisture content of about 5-7 weight percent.

11. The method of claim 9, wherein said placing step fluffier comprises placing a paper backing between the medium density fiberboard sheet and the wood veneer layer.

12. The method of claim 11, wherein said placing step further comprises placing a bonding agent between the medium density fiberboard sheet and the paper backing.

13. The method of claim 9, wherein said placing step further comprises placing a backing layer of fusible material between the medium density fiberboard sheet and the wood veneer layer.

14. The method of claim 9, wherein the plurality of wood veneer strips comprise a first wood veneer strip and a second wood veneer strip, wherein an edge surface of the first wood veneer strip is directly adjacent to an edge surface of the second wood veneer strip in side-by-side arrangement.

15. The method of claim 9, wherein more than one wood veneer strip of the plurality of wood veneer strips overlay the planar central portion of the medium density fiberboard sheet.

16. A method of making a composite non-planar door skin, comprising the steps of:
heating and pre-moisturizing a medium density fiberboard sheet;
placing the medium density fiberboard sheet and a wood veneer layer in a press without pre-moisturizing the wood veneer layer;
deforming and bonding the medium density fiberboard sheet and the wood veneer layer together under application of beat and pressure to form a composite non-planar door skin;
wetting the composite non-planar door skin to raise the moisture content of the wood veneer layer,
wherein the medium density fiberboard sheet is a continuous layer having an exterior major surface,
wherein the wood veneer layer covers the exterior major surface of the medium density fiberboard, and
wherein the composite non-planar door skin has an exterior surface comprising a planar central portion extending along a first plane, a first planar side portion and a second planar side portion positioned at opposite first and second sides of the planar central portion and extending in a second plane that is spaced apart from the first plane, a first angled wall connecting the first side of the planar central portion to the first planar side portion, and a second angled wall connecting the second side of the planar central portion to the second planar side portion.

17. The method of claim 16, the medium density fiberboard sheet and the wood veneer layer have a rectangular shape, and wherein the first plane is parallel to the second plane.

18. The method of claim 16, wherein the first plane and the second plane are spaced apart from one another by 6-9 mm.

19. The method of claim 16, wherein said bonding step comprises placing a layer of bonding material between the medium density fiberboard sheet and the wood veneer layer.

20. The method of claim 16, wherein the heated and pre-moistened medium density fiberboard sheet enters the press with a moisture content of about 10-12 weight percent and exits the press with a moisture content of about 5-7 weight percent.

\* \* \* \* \*